United States Patent
Ichino et al.

(10) Patent No.: US 8,190,034 B2
(45) Date of Patent: May 29, 2012

(54) OPTICAL RECEIVER APPLICABLE TO GPON SYSTEM

(75) Inventors: Moriyasu Ichino, Yokohama (JP);
Junichi Kataoka, Yokohama (JP);
Seiichi Ishikura, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 449 days.

(21) Appl. No.: 12/362,836

(22) Filed: Jan. 30, 2009

(65) Prior Publication Data

US 2009/0194675 A1    Aug. 6, 2009

(30) Foreign Application Priority Data

Jan. 31, 2008    (JP) ................. 2008-021373

(51) Int. Cl.
*H04B 10/06* (2006.01)
*G01J 1/44* (2006.01)

(52) U.S. Cl. .................... 398/202; 250/214 R

(58) Field of Classification Search ............. 250/214 R; 257/438, 440, E31.063, E31.061; 398/48–51, 398/79, 142, 164, 202, 212

See application file for complete search history.

(56) References Cited

U.S. PATENT DOCUMENTS

| 2005/0100349 A1* | 5/2005 | Kuhara et al. ............. 398/202 |
| 2005/0224697 A1 | 10/2005 | Nishiyama |

FOREIGN PATENT DOCUMENTS

| JP | 59-160345 | 9/1984 |
| JP | 05-343926 | 12/1993 |
| JP | 2000-244418 | 9/2000 |
| JP | 2005-304022 | 10/2005 |

* cited by examiner

*Primary Examiner* — Georgia Y Epps
*Assistant Examiner* — Renee Naphas
(74) *Attorney, Agent, or Firm* — Venable LLP; Michael A. Sartori; Leigh D. Thelen

(57) ABSTRACT

An optical receiver is disclosed, in which no additional photodiode to monitor the optical input level and no temperature control unit are necessary. The receiver of the invention provides an avalanche photodiode (APD) to receiver the first optical signal with the first wavelength and a PIN-PD to receive the second optical signal with the second wavelength. The optical input level for the APD is indirectly determined through the photocurrent generated by the PIN-PD and the bias voltage for the APD is so adjusted that the APD shows an optimum multiplication factor for the optical input level.

2 Claims, 4 Drawing Sheets

OPTICAL RECEIVER APPLICABLE TO GPON SYSTEM

BACKGROUND OF THE INVENTION

1. Field of the Invention

The present invention relates to an optical receiver circuit, in particular, the invention related to an optical receiver that includes an avalanche photodiode (APD) to receiver an optical signal with a digital format and a PIN photodiode that receives another optical signal with an analog format.

2. Related Prior Art

A subscriber optical system, typically called as the Passive Optical Network (PON) system, has been practically introduced. One of configurations of the PON system transmits three optical signals, that is, two digital optical signals one of which is transmitted from the head end to the subscriber and has the wavelength of 1.49 μm and the other of which is transmitted from the subscriber to the head end and has the wavelength of 1.31 μm, and, in addition of these two signals, an analog signal from the head end to the subscriber and has the wavelength of 1.55 μm.

The optical network terminal (hereafter denoted as ONT) set in respective subscribers is necessary to install a laser diode to transmit the digital signal with the wavelength of 1.31 μm, a photodiode to receive the other digital signal with the wavelength of 1.49 μm, another photodiode to receive the analog optical signal with the wavelength of 1.55 μm, and a wavelength division multiplexing filter (hereafter denoted as WDM filter) to multiplex or to de-multiplex these three optical signals.

FIG. 1 shows a configuration of the typical GPON system. This system includes the optical line terminal 1 (hereafter denoted as PLT) that provides the video online terminal (hereafter denoted as video OLT) 1a and the basic band OLT 1b. The former OLT, the video OLT, 1a delivers the video signal in the analog form with the wavelength of 1.55 μm, while, the latter OLT, the basic band OLT, 1b transmits the digital signal with the wavelength of 1.49 μm and concurrently receives the other digital signal with the wavelength of 1.31 μm. The WDM filter 3a de-multiplexes the optical signal with the wavelength of 1.31 μm from the signal with the wavelength of 1.49 μm, while, the other WDM filter 3b multiplexes the signal with the wavelength of 1.55 μm from the signals with the wavelengths of 1.31 and 1.49 μm. Thus, the signals with the wavelengths of 1.49 μm and 1.55 μm are transmitted in the optical fiber 4 to the subscribers after being ramified by the coupler 5.

In respective ONTs 2, the received wavelength multiplexed optical signal is divided into two signals, one of which has the analog format with the wavelength of 1.55 μm and the other of which has the digital format with the wavelength of 1.49 μm by the WDM filter 6, and is received by respective PDs. Specifically, the analog signal with the wavelength of 1.55 μm is received by the video receiver 2a that installs the PIN-PD, while, the digital signal with the wavelength of 1.49 μm is received by the digital receiver 2b with an avalanche photodiode (hereafter denoted as APD). The ONT 2 also provides the digital transmitter 2c that transmits the other digital signal with the wavelength of 1.31 μm to the receiver in the basic band OLT 1b in the OLT 1.

The digital receiver 2b usually implements an APD with the carrier multiplication function to get high sensitivity. The multiplication factor of the APD increases by raising the bias voltage applied thereto. However, unnecessary higher bias voltage results in the increase of the noise to degrade the sensitivity, the saturation of the downstream circuit and sometimes causes the breakdown of the APD by the self-current. Contrary, a less multiplication factor also degrades the sensitivity of the APD. Because the multiplication factor of the APD depends not only on the bias voltage but on the temperature thereof, various techniques to set the optimum multiplication facto of the APD has been proposed.

A Japanese Patent Application published as JP-2000-244418A has disclosed an optical communication system where an optical receiver provides a PIN-PD in addition to an APD, a temperature sensor, a memory and so on. The PIN-PD receives the signal light which the APD also receives, while, the memory stores an adequate voltage applied to the APD in connection with the temperature. The system adjusts the bias voltage applied to the APD based on the output from the PIN-PD that corresponds to the optical input level to the APD and the adequate voltage stored in the memory. Another Japanese Patent Application published as JP-S59-160345A has disclosed an optical receiver circuit that provides a shunting transistor connected in parallel with the APD. This transistor may quickly shunt the current supplied from the power supply to the APD, which enhances the response of the optical receiver circuit.

Still further, a Japanese Patent Application published as JP-H05-343926A has disclosed an optical receiver circuit that provides a dumping resistor disposed between the bias supply and the APD. This dumping resistor may adjust the bias voltage directly applied to the APD by the current feedback function. A Japanese Patent Application published as JP-2005-304022A has disclosed an optical receiver with an APD whose bias voltage is supplied through the current mirror circuit. The receiver circuit disclosed therein adjusts the bias voltage to the APD so as to keep constant the average photocurrent generated in the APD and monitored through the current mirror circuit.

Prior receiver circuits described above have left various subjects. For instance, the optical receiver system is necessary to implement an additional PIN-PD to monitor the optical input level. To shunt the bias current by the shunting transistor connected in parallel to the APD increases the power dissipation of the receiver circuit. The shunted current only wastes the power. For the receiver circuit that provides the dumping resistor, the power consumption may increase by this dumping resistor when the optical input level becomes large and the APD generates relatively larger current.

The present invention is to provide an optical receiver circuit without any additional PD only for monitoring the optical input level to the APD, any circuits to compensate the temperature characteristic of the APD, and any increase the power consumption of the circuit around the APD.

SUMMARY OF THE INVENTION

One aspect of the present invention relates to an optical receiver that comprises an APD, a PIN-PD and a control unit. The APD receives first signal light with a first wavelength, while, the PIN-PD receives second signal light with a second wavelength different from the first wavelength. The control unit controls a bias voltage applied to the APD such that a multiplication factor attributed with the APD becomes substantially equal to a preset value in connection with optical power input to the APD that is estimated from the optical power input to the PIN-PD. The receiver of the invention may further comprise a memory that stores the preset value in connection with the optical power input to the APD. The control unit may read the preset value out from the memory and controls the bias voltage such that the multiplication factor, which is estimated from a ratio of the first photocurrent output from the APD to the second photocurrent output from the PIN-PD, becomes substantially equal to the preset value.

DESCRIPTION OF PREFERRED EMBODIMENTS

Next, some preferred embodiments of the present invention will be described in detail. An APD shows relatively larger conversion efficiency compared to that of a PIN-PD because the APD inherently has a function to multiply carriers originally induced by the optical input, which is called as the self-multiplication function and strongly depends on the bias Voltage applied between the anode and the cathode. The multiplication factor M of the APD is given by:

$$M = I_{apd}/(0.805 \times \eta \times \lambda(\mu m) \times P_i) \quad (1)$$

where $I_{apd}$, $\eta$, $\lambda$ and $P_i$ are the APD photocurrent, the quantum efficiency, the wavelength, and the input optical power, respectively.

Under a bias condition that gives a small multiplication factor M, the photocurrent generated by the APD becomes smaller for an input optical power $P_i$, which results in a less sensitivity of the APD. On the other hand, under another bias condition that gives a greater multiplication factor M, the APD may cause larger noises, which also results in a less sensitivity. That is, the APD in the multiplication factor M thereof is necessary to be adjusted so as to show an ideal signal-to-noise ratio even when the optical power input thereto becomes the minimum. The multiplication factor M is expressed as followed:

$$M = 2/\{1 - (V_{apd}/V_b)^n\} \quad (2)$$

where $V_{apd}$, $V_b$ and n are the bias voltage, the breakdown voltage, and a constant attributed to an APD, respectively.

Based on equation (2) above described, because the breakdown voltage shows the temperature dependence, it is necessary to have the temperature dependence of the bias voltage $V_{apd}$ similar to that of the breakdown voltage $V_b$ in order to keep the multiplication factor M constant. This makes it necessary to define the multiplication factor M at respective temperatures.

Figure 1:
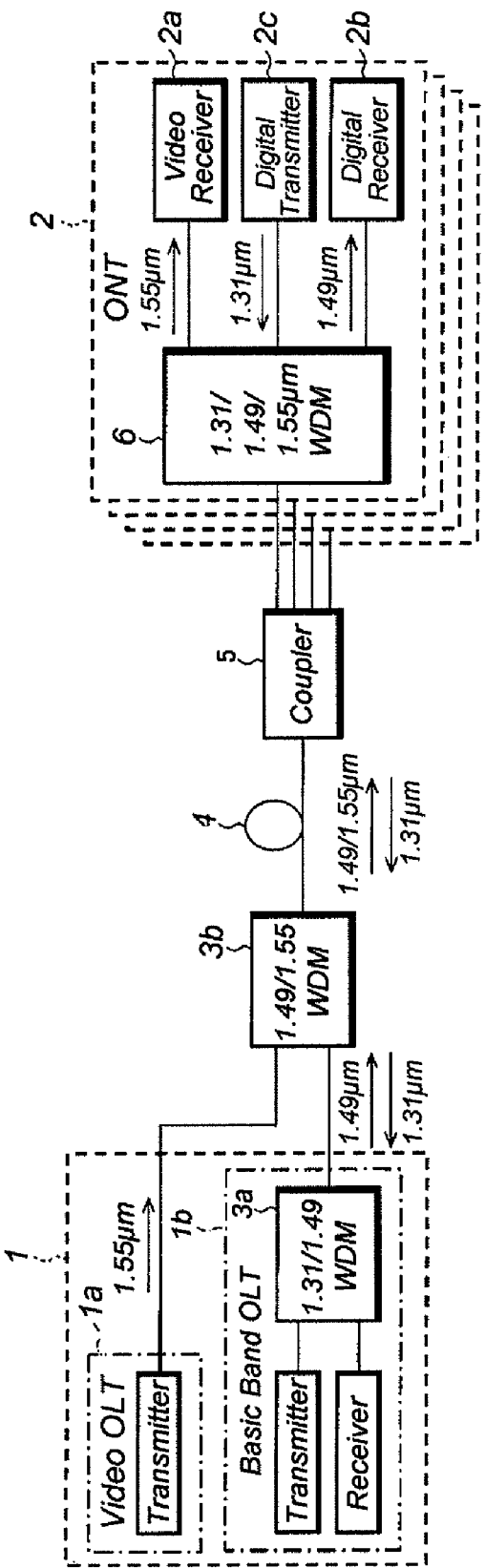
FIG. 1 is a block diagram of the optical network system that implements three wavelengths, two of which is for the digital signal and the last is for the video signal.
Figure 2:
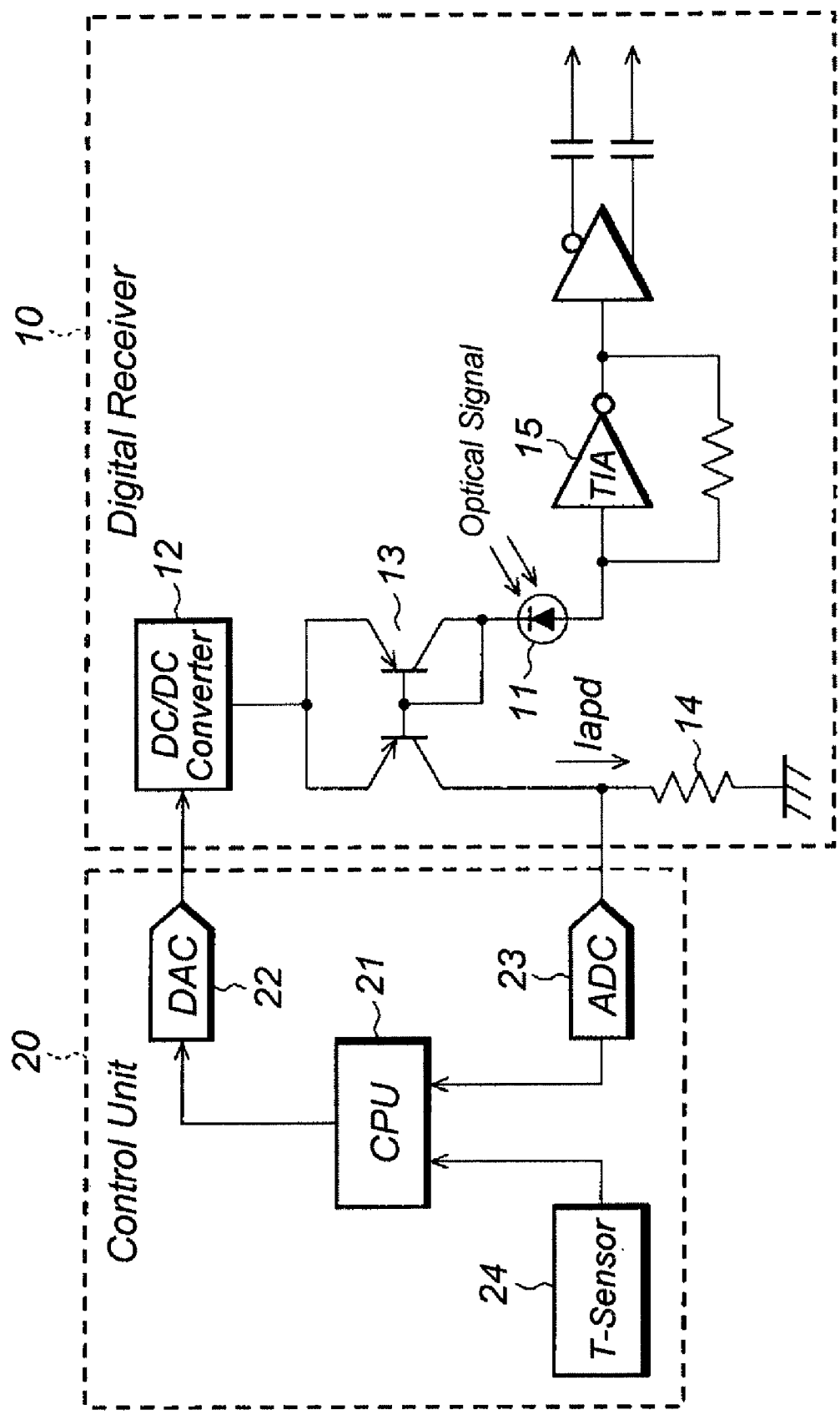
FIG. 2 illustrates a block diagram of a typical control circuit of the bias voltage applied to the APD.

FIG. 2 illustrates a typical block diagram to vary the bias voltage $V_{apd}$ applied to the APD 11. The digital receiver 10 in FIG. 2 corresponds to the digital receiver 2b shown in FIG. 1 which receives the optical signal with a wavelength of 1.49 μm that is transmitted through the optical fiber 4. The APD 11 generates the photocurrent under a condition where the bias voltage $V_{apd}$ is applied thereto. This photocurrent is converted into a voltage signal by the inverting amplifier 15 with a feedback resistor. The circuit block of the inverter amplifier 15 with the feedback resistor is often called as a trans-impedance amplifier.

The bias voltage $V_{apd}$ applied to the APD 11 is provided from the DC-to-DC converter (DC/DC converter) 12 that boosts the output of the digital-to-analog converter (DAC) 22 in the control unit 20. The control unit 20 also includes the CPU 21 to control the DAC 22. Thus, the output of the DC/DC converter 22 is applied to the APD 11 through the current mirror circuit 13. One of the current outputs of the current mirror circuit 13 is coupled with the APD 11, while the other output is coupled with the sensing resistor 14. The current mirror circuit 13 may reflect the photocurrent generated by the APD 11 in the mirror current Iapd brought out from the other output that causes the voltage in the sensing resistor 14. Thus, the photocurrent generated by the APD 11 may be detected as a voltage signal measured between terminals of the sensing resistor 14.

The voltage signal converted by the sensing resistor 14 is detected by the analog-to-digital converter (ADC) 23 provided in the control unit 20 to convert it into a digital form to be processed in the CPU 21. The control unit 20 also includes a temperature sensor 24. Thus, even when the APD 11 is operated in any temperatures, a suitable bias voltage may be provided to the APD 11, and the multiplication factor M may be kept in an adequate value. The suitable bias voltages for respective temperatures are determined in advance to the practical operation of the optical receiver 10.

According to equation (1) above described, we can estimate the multiplication factor M of the APD 11 only by detecting the photocurrent Iapd and the optical input power Pi under the condition where the wavelength of the input light is known. In other words, the photocurrent Iapd may be controlled so as to keep the multiplication factor M constant. However, because the circuit shown in FIG. 2 is unable to detect the optical input power Pi, the applied bias voltage $V_{apd}$ is practically controlled based on the equation (2) described above, which inevitably requires to monitor or to control the temperature of the APD 11.

The present embodiment used in the GPON system illustrated in FIG. 1 utilizes the PIN-PD, whose temperature characteristics are independent on the temperature compared with that of the APD, installed in the video receiver 2a. That is, the optical input power Pi to the digital receiver 2b installing the APD may be estimated through the output of the video receiver 2a. Thus, the digital receiver 2b is unnecessary to control the temperature of the APD to maintain the multiplication factor M of the APD constant because the information of the optical input power derived from the video receiver 2a is utilized to adjust the bias voltage $V_{APD}$ provided to the APD 11.

A method to obtain the optical input power for the APD in the digital receiver 2b will be described. The GPON system illustrated in FIG. 1 outputs the video signal with the wavelength of 1.55 μm by the video OLT 1a and also outputs the digital signal with the wavelength of 1.49 μm by the base band OLT, both of which have the constant output power. The WDM filter 3b multiplexes these two optical signals to transmit them through the single optical fiber 4, the optical coupler 5, and the WDM filter implemented in the ONT 2. The video signal with the wavelength of 1.55 μm is detected by the PIN-PD installed in the video receiver 2a, while, the digital signal with the wavelength of 1.49 μm is detected by the APD installed in the digital receiver 2b.

The optical input power sensed by the video receiver 2a and the digital receiver 2b depends on the output of the video OLT 1a, that of the basic band OLT 1b, the optical loss by the optical fiber, and that of the optical components of the coupler 5 and the WDM filter 6. First investigating the optical loss between the OLT 1 and the ONT 2, the optical signal with the wavelength of 1.49 μm and the signal with the wavelength of 1.55 μm inherently show different characteristics with respect to each other. However, the passive optical component, such as the optical coupler 5, shows the optical characteristics substantially independent on the wavelength, in particular, in a case where the transmission distance is short and the difference in the wavelengths is small, typically between 1.49 μm and 1.55 μm.

For instance, the WDM filters, 3b and 6, to multiplex and to de-multiplex optical signals with different wavelengths, typically show the optical loss of around 0.5 dB, while the optical coupler 5 that divides the optical signals into four signals shows the loss of about 6 dB but independent of the wavelengths. Moreover, assuming the loss of the optical fiber 4 to be 0.24 dB/km at the wavelength of 1.49 μm and 0.21 dB/km at 1.55 μm; the total optical loss by the optical fiber 4 becomes 4.8 dB at 1.49 μm and 4.2 dB at 1.55 μm for the optical fiber 4 with a length of 40 km. Thus, the summed up optical loss from the OLT, 1a or 1b, to the receiver 2a or 2b, becomes 11.8 dB at 1.49 μm and 11.2 dB at 1.55 μm, respectively.

Setting the optical output power from the video OLT 1a whose wavelength is +10 dBm at 1.55 μm, while, that from the base band OLT is +3 dBm at 1.49 μm, the input optical power of the video receiver 2a with the PIN-PD at the ONT in respective subscribers becomes −1.2 dBm (=10-11.2), while, it becomes −8.8 dBm (=3-11.8 dBm) for the digital receiver 2b with the APD.

Figure 3:
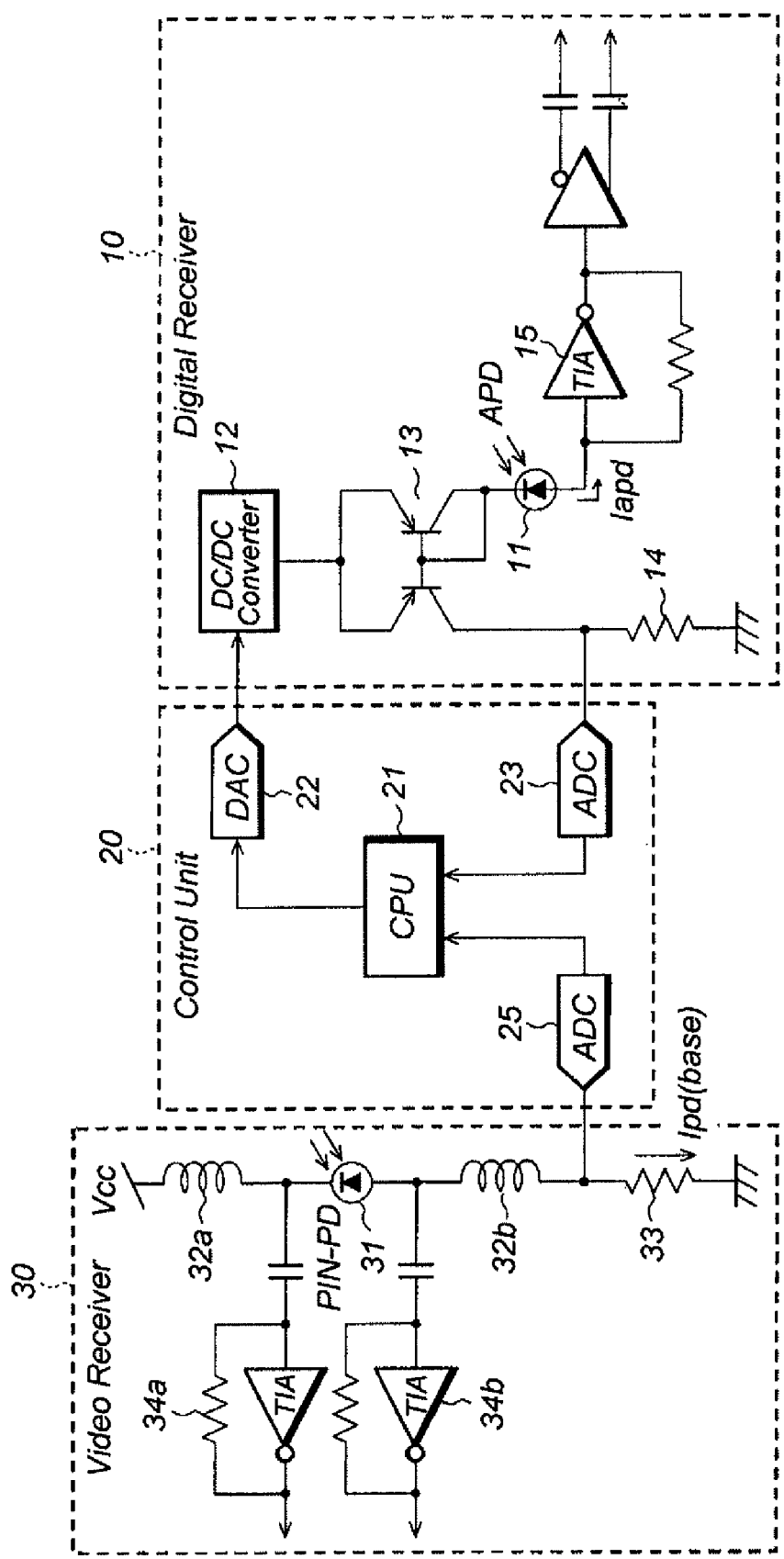
FIG. 3 illustrates a block diagram of the optical line terminal according to an embodiment of the present invention.

Next, the receiver according to the present embodiment of the invention will be described as referring to FIG. 3. The optical receiver of the present embodiment provides the video receiver 30 in addition to the digital receiver 10 and the control unit 20 illustrated in FIG. 2. This video receiver 30, which corresponds to the video receiver 2a illustrated in FIG. 1, receives, by the PIN-PD 31, the optical signal with the wavelength of 1.55 μm in the analog form. The PIN-PD 31, which is biased by the power supply Vcc at the cathode thereof, generates the photocurrent. Because of the insertion of two inductors in the cathode and anode of the PIN-PD 31, the low frequency components of the photocurrent $I_{pd(base)}$ generates a voltage signal in the series resistor 33, while, high-frequency components of the photocurrent are led to the amplifiers, 34a and 34b.

The voltage signal derived from the low frequency components of the photocurrent $I_{pd(base)}$ is converted into the digital form by the ADC 25 to be processed by the CPU 21. This configuration of the ADC 25 may be distinguished from the temperature monitor signal provided from the temperature sensor 24 appeared in FIG. 2.

When the PIN-PD 31 in the ONT 2 receives the optical signal whose input power is −1.2 dBm and the optical output power of the video OLT 1a for the video signal with the wavelength of 1.55 μm is set to be +10 dB as explained previously; the CPU 21 may evaluate the total optical loss between the OLT 1 and ONT 2 to be 11.2 dBm for the wavelength of 1.55 μm. Moreover, the transmission system from the OLT 1 to the ONT 2 inherently has the wavelength dependence of the optical loss between the 1.55 and 1.49 μm, that is, the loss slightly increases at the wavelength of 1.49 μm to 11.8 dBm compared with that for 1.55 μm, the CPU 21 may determine the optical input power Pi for the APD 11 in the digital receiver 10 to be −8.8 dBm (=3-11.8). When the conversion factor of the PIN-PD 31 is 0.9 A/W, the PD 31 generates the photocurrent of Ipd=0.68 mA(=0.9×Pin) for the optical input level of −1.2 dBm.

The digital receiver 10, as illustrated in FIG. 2, receives the signal light with the wavelength of 1.49 μm by the APD 11. The APD multiplies the photo-carriers by being applied with the bias voltage from the DC/DC converter 12 and generates the photocurrent $I_{apd}$ which is sent to the trans-impedance amplifier 15. The current mirror circuit 13, which is set between the DC/DC converter 12 and the APD 11 so as to connect the APD 11 in one current path thereof, reflects the photocurrent $I_{apd}$ generated by the APD 11 to another current path connecting the resistor 14.

The resistor 14 converts the photocurrent $I_{apd}$ into a voltage signal that is converted into the digital form by the ADC converter 23 in the control unit 20 to be processed in the CPU 21. That is, referring to equation (1), the photocurrent $I_{apd}$ is directly obtained by the APD 11 though the current mirror circuit 13 and the converting resistor 14, while, the optical input level Pi may be indirectly obtained by the PIN-PD 31 through the photocurrent $I_{pd(base)}$. Both currents, $I_{apd}$ and $I_{pd(base)}$, are digitally processed in the CPU so as to determine the multiplication factor M satisfying equation (1). The CPU 21 adjusts the DC/DC converter 12 so as to set the multiplication factor M obtained from two currents, $I_{apd}$ and $I_{pd(base)}$ to be a preset value.

Figure 4:
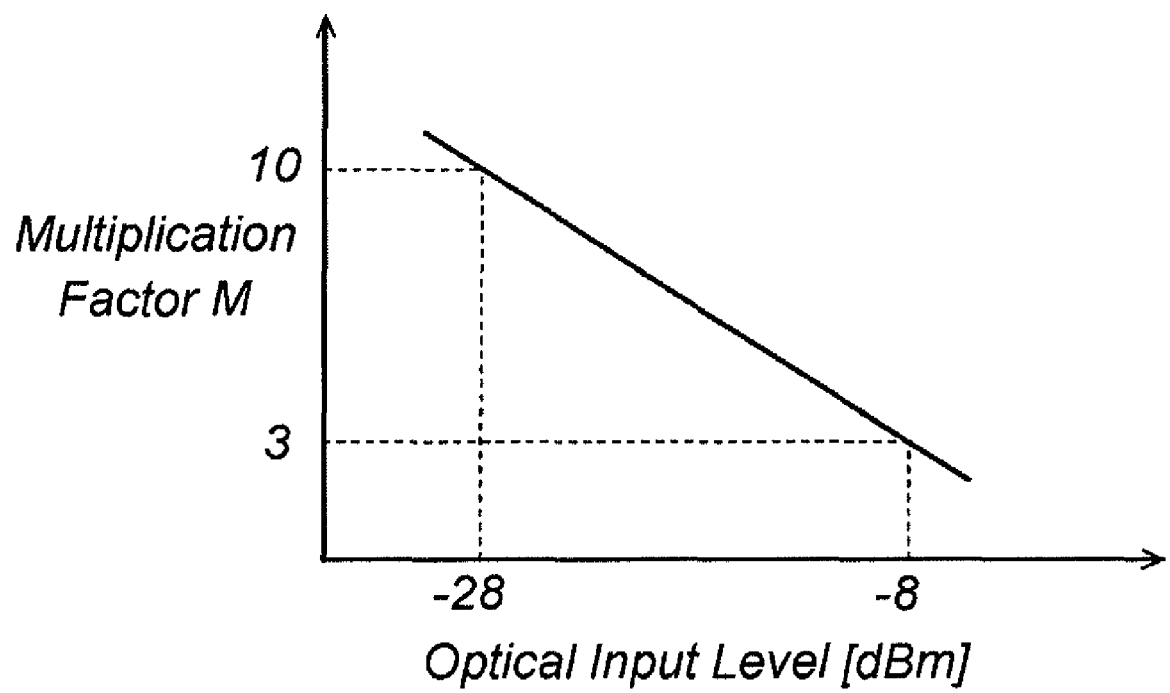
FIG. 4 shows a relation between the optical input level and the multiplication factor of the APD.

FIG. 4 shows a relation between the multiplication factor M and the optical input level in a unit of dBm. When the optical input level is small, a larger multiplication factor M is necessary for the APD 11 in the digital receiver 10, while, a relatively smaller factor M is preferable when the optical input level is large. For instance, assuming that the minimum optical input level is −28 dBm, the multiplication factor M of 10 is necessary, while, when the input level becomes −8 dBm, the multiplication factor M of 3 is preferable.

In the present embodiment of the invention, the optical input level for the APD 11 in the digital receiver 10 may be indirectly obtained by the photocurrent $I_{pd(base)}$ generated by the PIN-PD 31 in the video receiver; accordingly, the CPU 21 may set the bias voltage applied to the APD 11 such that the APD 11 has the multiplication factor M optimum for the input level. When the CPU 21 or the control unit 20 has a memory that relates the optical input level with the optimum multiplication factor, the optimum multiplication factor M may be easily obtained.

Thus, the present embodiment of the invention may set the bias voltage for the APD to be optimum for the optical input level independent of the temperature of the APD, the complicated procedure to set the bias voltage at respective temperatures. Moreover, the PIN-PD in the video receive indirectly monitors the optical input level for the APD in the digital receiver, no additional devices to monitor the optical input level is necessary, which reduces the cost of the ONT. Still further, the bias voltage for the APD is directly controlled by the digital-to-digital converter through the optical input level for the APD, the ONT may be unnecessary to insert the series resistor between the APD and the bias voltage source, which reduces the power dissipation of the ONT.

What is claimed is:

1. An optical receiver, comprising:
    an avalanche photodiode that receives first signal light with a first wavelength in 1.49 μm band and generates a first photocurrent attributed to a multiplication factor of said avalanche photodiode, wherein said first signal light has a digital form;
    a PIN photodiode that receives second signal light with a second wavelength in 1.55 μm band and generates a second photocurrent, wherein said second signal light is an analog video signal;
    a control unit configured to estimate optical power input to said avalanche photodiode based on said second photocurrent; and
    a memory for storing said preset value in connection with said optical power,
    wherein said control unit reads out said preset value from said memory corresponding to said optical power based on said second photocurrent and controls said bias voltage such that said multiplication factor estimated from a ratio of said optical power to said second photocurrent becomes substantially equal to said preset value read out from said memory.

2. An optical receiver system applied in a gigabit passive optical network system and coupled with a single optical fiber that transmits first signal light with a first wavelength and second signal light with a second wavelength different from said first wavelength, comprising:
- a wavelength division de-multiplexing filter that de-multiplexes said first signal light in 1.55 μm band from said second signal light in 1.49 μm band; and
- an optical receiver including,
- an avalanche photodiode configured to receive said first signal light and output a first photocurrent attributed to a multiplication factor,
- a first receiver circuit configured to monitor said first photocurrent output from said avalanche photodiode,
- a PIN photodiode configured to receive said second signal light and generate a second photocurrent,
- a second receiver circuit configured to monitor said second photocurrent output from said PIN photodiode,
- a memory that stores preset values in connection with said optical power, and
- a control unit configured to estimate optical power input to said avalanche photodiode based on an output of said second receiver circuit, to estimate said multiplication factor by a ratio of said optical power to said output of said second receiver circuit, and to control a bias voltage applied to said avalanche photodiode such that said multiplication factor of said avalanche photodiode becomes said preset value read out from said memory corresponding to said output of said second receiver circuit.

* * * * *